United States Patent

[11] 3,628,057

[72] Inventor Hans Mueller
Houston, Tex.

[21] Appl. No. 47,854
[22] Filed June 19, 1970
[45] Patented Dec. 14, 1971
[73] Assignee Allen-Bradley Company
Milwaukee, Wis.

[54] CORRECTIVE CIRCUIT FOR AN ACTIVE NARROW NOTCH FILTER
10 Claims, 5 Drawing Figs.

[52] U.S. Cl. .......... 307/105,
307/233, 328/167
[51] Int. Cl. .......... H02m 1/12
[50] Field of Search .......... 307/232,
233, 262, 105; 328/166, 167, 265; 343/79; 321/10;
330/149

[56] References Cited

UNITED STATES PATENTS 3,353,147 11/1967 Meeker .......... 328/167 X

*Primary Examiner*—Roy Lake
*Assistant Examiner*—James B. Mullins
*Attorney*—Arthur H. Seidel

ABSTRACT: An active narrow notch filter is adapted for connection between a power source and a load to filter out noise signals appearing on the power lines. A feedback loop having a stop-band notch filter is connected to the power lines and feeds interference signals to an amplifier which drives a correction transformer inserted in the power lines to cancel out interference signals from the power source. A corrective circuit is connected to form a feedback loop with the amplifier and notch filter to generate a feedback signal that is applied to eliminate any power line signal that passes through the notch filter. This corrective circuit has a first detector circuit producing an error signal which is fed through a first modulator to generate one component of the feedback signal that cancels out power line signals passing through the notch filter, and a second detector circuit and modulator that produces a second component of the desired feedback signal that is in quadrature with the first component.

Patented Dec. 14, 1971 3,628,057

3 Sheets-Sheet 1

INVENTOR
HANS MUELLER

BY Arthur H. Seidel

ATTORNEY

INVENTOR
HANS MUELLER

BY Arthur H. Riddel

ATTORNEY

INVENTOR
HANS MUELLER

BY Arthur H. Seidel

ATTORNEY

CORRECTIVE CIRCUIT FOR AN ACTIVE NARROW NOTCH FILTER

BACKGROUND OF THE INVENTION

The field of invention is electrical filters for attenuating interference frequencies without significant attenuation of the desired power frequency being supplied to a load. More particular, the invention herein relates to a corrective circuit for use in an active band-pass filter of the type disclosed in the pending application of Aemmer et al., Ser. No. 714,727 and now Pat. No. 3,53,652 and entitled "Active Narrow Notch Filter." The filter disclosed therein takes a sample of the power source signal being applied to the electrical apparatus and feeds it back through an amplifier to a correction transformer whose secondary is connected in the power line. This signal fed back to the correction transformer is passed through a stop-band notch filter which removes the power source frequency. The interference signals remaining are induced into the secondary of the correction transformer where they oppose or null out interference emanating on the power lines.

If power source frequency is allowed to pass through the stop-band notch filter, the resulting voltage induced in the correction transformer will also oppose the power source frequency being supplied to the electrical apparatus, thus substantially reducing the efficiency of the filter. In the Aemmer et al. disclosure, an elaborate circuit called an adjustment circuit is used to detect any power source frequency passing through the stop-band notch filter and generate a corrective signal which is injected to cancel out the power source frequency passing through the stop-band notch filter.

SUMMARY OF THE INVENTION

Applicant's invention relates to a corrective circuit for use in an active band-pass filter of the type disclosed in the above cited patent application, that provides improved cancelling out of the power source signals that pass through the stop-band notch filter. More particularly, the invention resides in the combination of reference and orthogonal phase detectors which each generate an error signal indicating the magnitude and polarity of the in phase (reference) and 90° out of phase (orthogonal) components of the power source signals passing through the stop-band notch filter; a signal generator connected to the power line and producing plus and minus reference signals and plus and minus orthogonal signals; and a reference and an orthogonal modulator each connected to receive and use the respective reference and orthogonal error signals to amplitude modulate the signals from the signal generator to construct a feedback signal which is equal to and 180° out of phase with the power source signal passing through the stop-band notch filter.

It is the general objective of this invention to provide a corrective circuit which will substantially improve the performance of an active band-pass filter.

More specifically, it is an objective of this invention to provide a corrective circuit which generates a feedback signal that will cancel a power source signal of any phase angle that passes through the stop-band notch filter.

Another objective is to provide a fast reacting and inexpensive corrective circuit as compared with the digital circuits presently used.

Still another objective is to provide a means of injecting the feedback signal at the common or ground point of the stop-band notch filter without introducing an undesirable phase shift in the signal.

The foregoing and other objects and advantages of this invention will appear from the following description, in which description and the accompanying drawings there is shown and described by way of illustration and not of limitation a preferred embodiment of the invention. Reference is made to the claims herein for a determination of the scope of the invention.

DESCRIPTION OF THE PREFERRED EMBODIMENT

Figure 1:
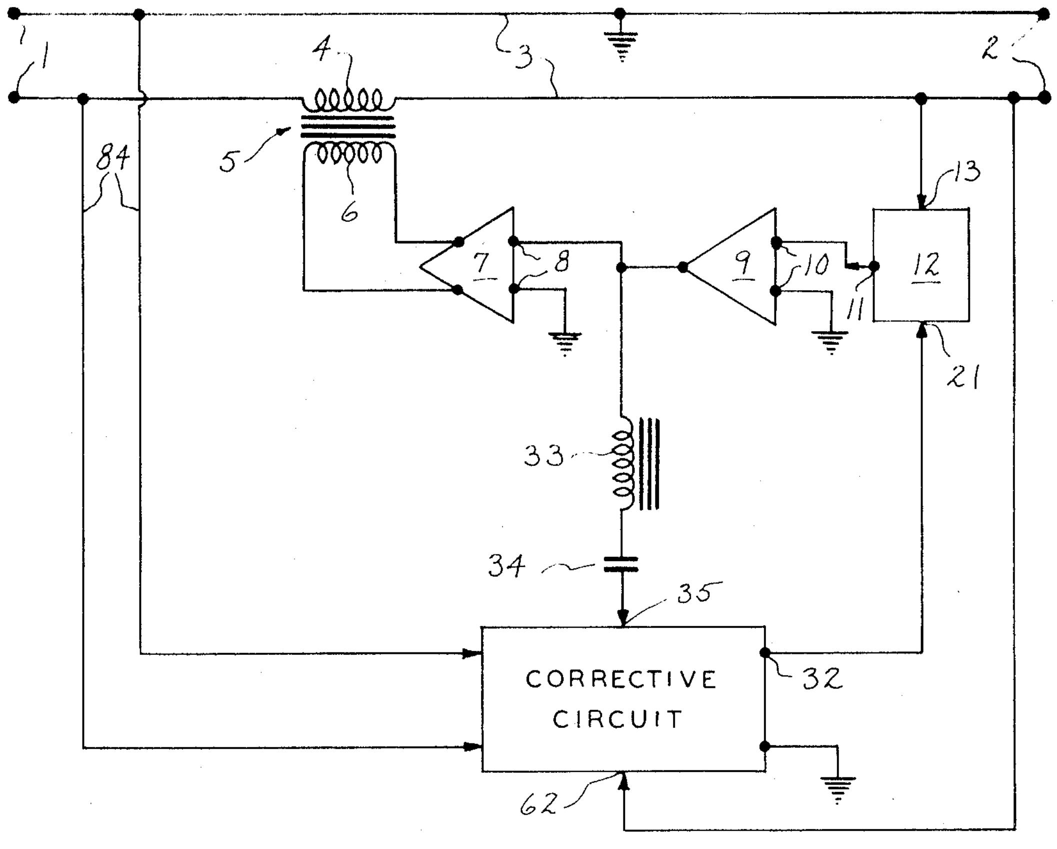
FIG. 1 is a schematic block diagram of an active band-pass filter embodying the invention.

Referring to FIG. 1 of the drawings, there is shown a schematic block diagram of an active type filter using the invention herein. The circuit includes a pair of input terminals 1 for connection to a suitable power source, such as a 60 Hz. commercial source, and a pair of output terminals 2 for connection to a load to which the power source frequency is to be delivered free of interference. Extending between the input terminals 1 and the output terminals 2 are power lines 3, one of which has inserted therein the secondary winding 4 of a correction transformer 5. The primary winding 6 of the correction transformer 5 is connected to the output terminals of a power amplifier 7. One of the two input terminals 8 on the power amplifier 7 is connected to ground and the other is connected to the output of a preamplifier 9. One of the two input terminals 10 of the preamplifier 9 is connected to ground and the other is connected to the output terminal 11 of a stop-band notch filter 12. An input terminal 13 on the notch filter 12 is connected to the power line 3 in which the winding 4 is inserted.

The notch filter 12, amplifiers 7 and 9, and the correction transformer 5 function as a feedback loop for interference signals appearing on the power lines 3. These interference signals are passed by the notch filter 12 and amplified to drive the correction transformer 5. The feedback loop is designed such that these interference signals are induced into the secondary winding 4 of the correction transformer 5 in phase opposition to the interference signal on the power lines 3. The narrow stop-band of the notch filter 12 blocks passage of the power source signal into this feedback loop, thus allowing only interference frequencies appearing on the power lines 3 to reach the correction transformer 5. As a result, the power source frequency is fed to the output terminals 2 with very little distortion due to interference frequencies or attenuation by the filter.

Figure 2:
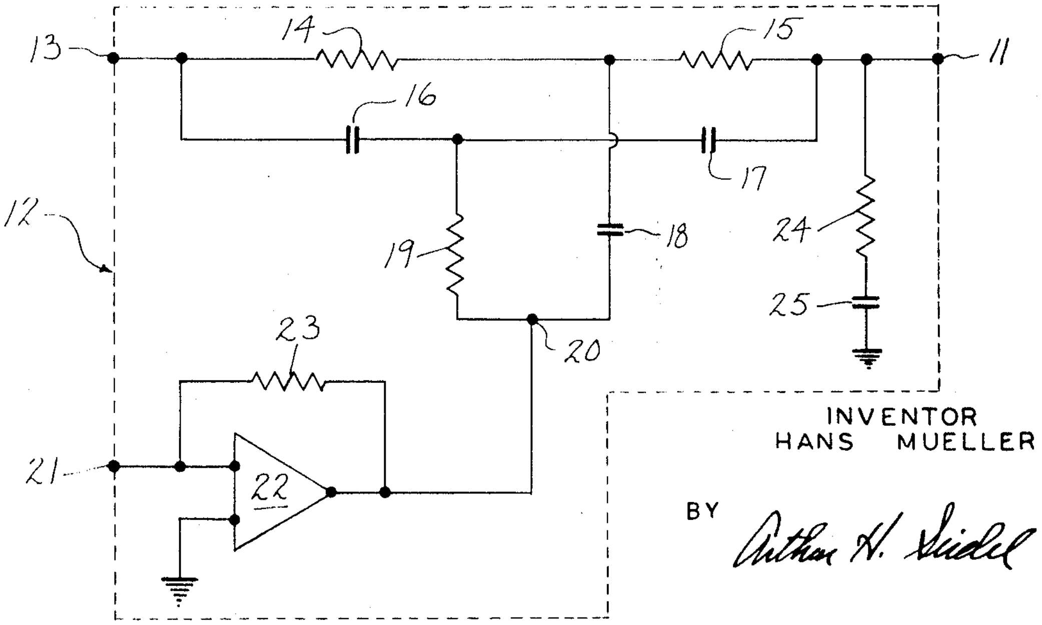
FIG. 2 is a schematic wiring diagram of a stop-band notch filter which forms a part of the circuit shown in FIG. 1.

As mentioned, the notch filter 12 is characterized by a very narrow stop-band, and in the preferred embodiment shown in FIG. 2 it is of the twin-T type, a configuration familiar to those skilled in the art. Referring to FIG. 2, the output terminal 11 of the notch filter 12 is connected to the input terminal 13 through a first filter resistor 14 and a second filter resistor 15. Also, connected in series between the input terminal 13 and output terminal 11 is a first filter capacitor 16 and a second filter capacitor 17. Connected between the first and second filter resistors 14 and 15 is one end of a third filter capacitor 18, which in turn is connected to a third filter resistor 19 at a common point 20. The other end of the third filter resistor 19 is connected between the first and second filter capacitors 16 and 17. A feedback injection terminal 21 is connected to the inverting input of a phase inverter 22, whose output is connected to the common point 20. The noninverting input of the phase inverter 22 is connected to ground, and there is a feedback resistor 23 connecting the phase inverter output to the inverting input. A load resistor 24 connected in series with a load capacitor 25 is connected between the notch filter output terminal 11 and ground.

Figure 4:
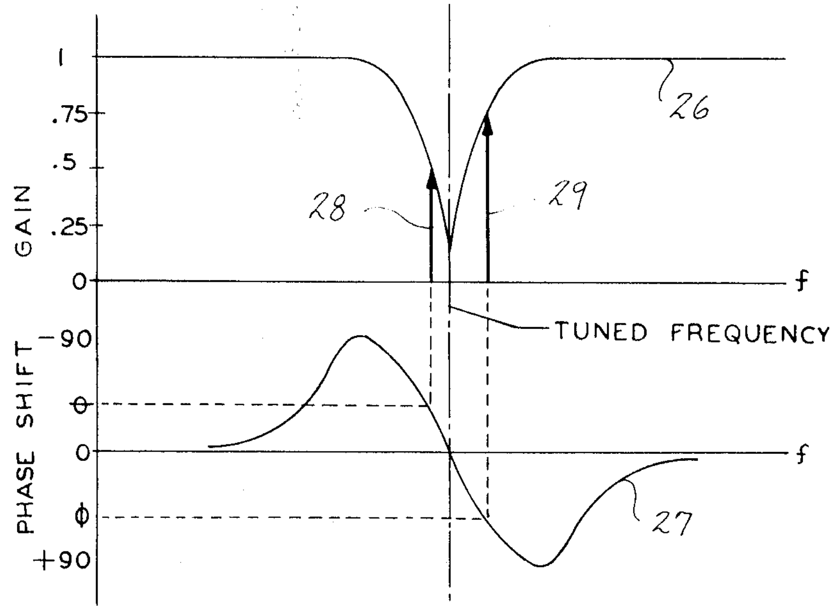
FIG. 4 is a graphic representation of electrical characteristics of a stop-band notch filter.

The component values in the notch filter 12 are chosen so that if no feedback signal were injected into the phase inverter 22, the common point 20 would be at ground potential, and the notch filter would have the frequency characteristics shown by the curves in FIG. 4. The transfer curve 26 of the twin-notch filter 12 is substantially level over the operating range of the apparatus, except at its tuned frequency of 60 Hz. where the gain drops almost to zero. The phase shift curve 27 represents the phase shift occurring in a signal passing through the notch filter 12. For a band of frequencies below the tuned frequency there is a typical negative phase shift of up to 90° and there is a corresponding band of frequencies above the tuned frequency which undergo a positive phase shift. The scales for the curves 26, 27 have been selected for purposes of clarity in illustration, and are not to be construed as proportionally accurate.

When the notch filter 12 is exactly tuned to the power source frequency substantially all of such frequency will be filtered out. However, as seen by the transfer curve 26, a small amount of power source signal will tend to pass through the notch filter 12 and appear at the output terminal 11. However, in the operation of the circuit a feedback signal will be applied to the phase inverter 22 to cancel out this small power source signal, so that practically no power source frequency is fed to the preamplifier 9.

Phase shift curve 27 in FIG. 4 indicates that the power source signal tending to appear at output terminal 11 is not only very small, but that it will not undergo any phase shift when the notch filter 12 is perfectly tuned to the power frequency. Unfortunately, however, temperature drift in the twin-T notch filter 12, and frequency shifts in the power source signal, make it nearly impossible to maintain a perfectly tuned filter. FIG. 4 shows in graphic form the result of a detuned notch filter 12. If a temperature change causes the tuned frequency of the notch filter 12 to shift upwards, or equivalently, if the power source frequency shifts downward, a power source signal of substantial amplitude represented by the vector 28 will tend to pass through the notch filter 12 and into the preamplifier 9. Furthermore, such a power source signal undergoes a negative phase shift in the amount of degrees. On the other hand, if temperature drift causes the tuned frequency of the notch filter 12 to shift downward, or the power source frequency shifts upward, then a substantial power source signal represented by the vector 29 and having a positive phase shift of degrees would be transmitted to the preamplifier 9 in the absence of a feedback signal to the phase inverter 22.

Figure 5:
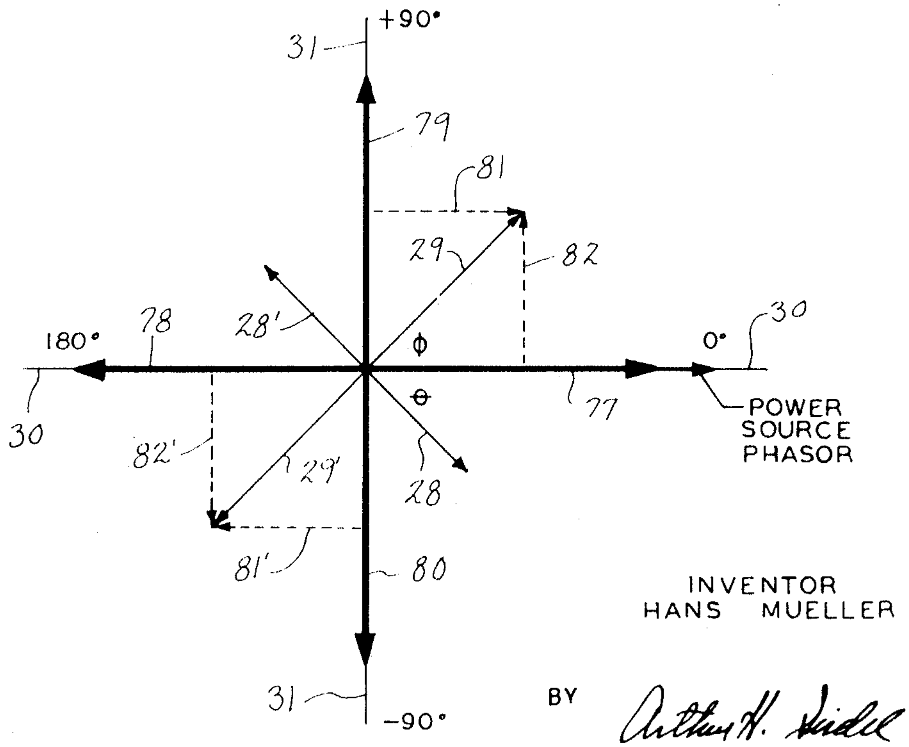
FIG. 5 is a phasor diagram of the power source frequency that may occur within the circuit of FIG. 1.

The vectors 28 and 29 are also shown in the phasor diagram of FIG. 5. In this diagram the power source signal is shown as a phasor pointing to the right along a reference axis 30 which is perpendicular to an orthogonal axis 31. In order not to attenuate, or cancel, the power source signal in the power lines 3 in a manner similar to that accomplished for the interference signals, it is necessary to "null out" any power source signal, such as those represented by the vectors 28 or 29, which tends to pass through the notch filter 12 into the preamplifier 9. The remainder of the circuit, now to be described, constitutes a corrective circuit which provides this necessary "nulling" function, and which takes into account the phase shift that occurs whenever there is any misalignment between power source frequency and the "tuned" frequency of the notch filter 12.

An objective of the corrective circuit is to inject a feedback signal into the notch filter 12 that will cancel out substantially all the power source signal tending to appear at the output terminal 11 of the notch filter 12. For example, assume that a power source signal having the amplitude and phase shown by the phasor 29 in FIG. 5 appears at the output terminal 11 of the notch filter 12. The corrective circuit is connected to the output of the preamplifier 9 to detect the amplitude and phase of the phasor 29, as modified by the preamplifier 9. Appearing on the corrective circuit output terminal 32 is a feedback signal of substantially equal amplitude to phasor 29, but 180° out of phase therewith. This feedback signal is represented in FIG. 5 by the phasor 29′, and is connected directly to the feedback injection terminal 21 of the notch filter 12. The feedback signal is then inverted 180° by the phase inverter 22 and applied to the common point 20. This accomplishes the desired cancellation of the phasor 29 that appeared at the output terminal 11.

To ensure that only the power source frequency appearing at output terminal 11 is cancelled out by the corrective circuit, and not any interference signals, a band-pass filter comprised of coil 33 and a capacitor 34 is inserted between the output of the preamplifier 9 and the corrective circuit input terminal 35. This band-pass filter effectively blocks the interference signals while passing the power source signal.

Figure 3:
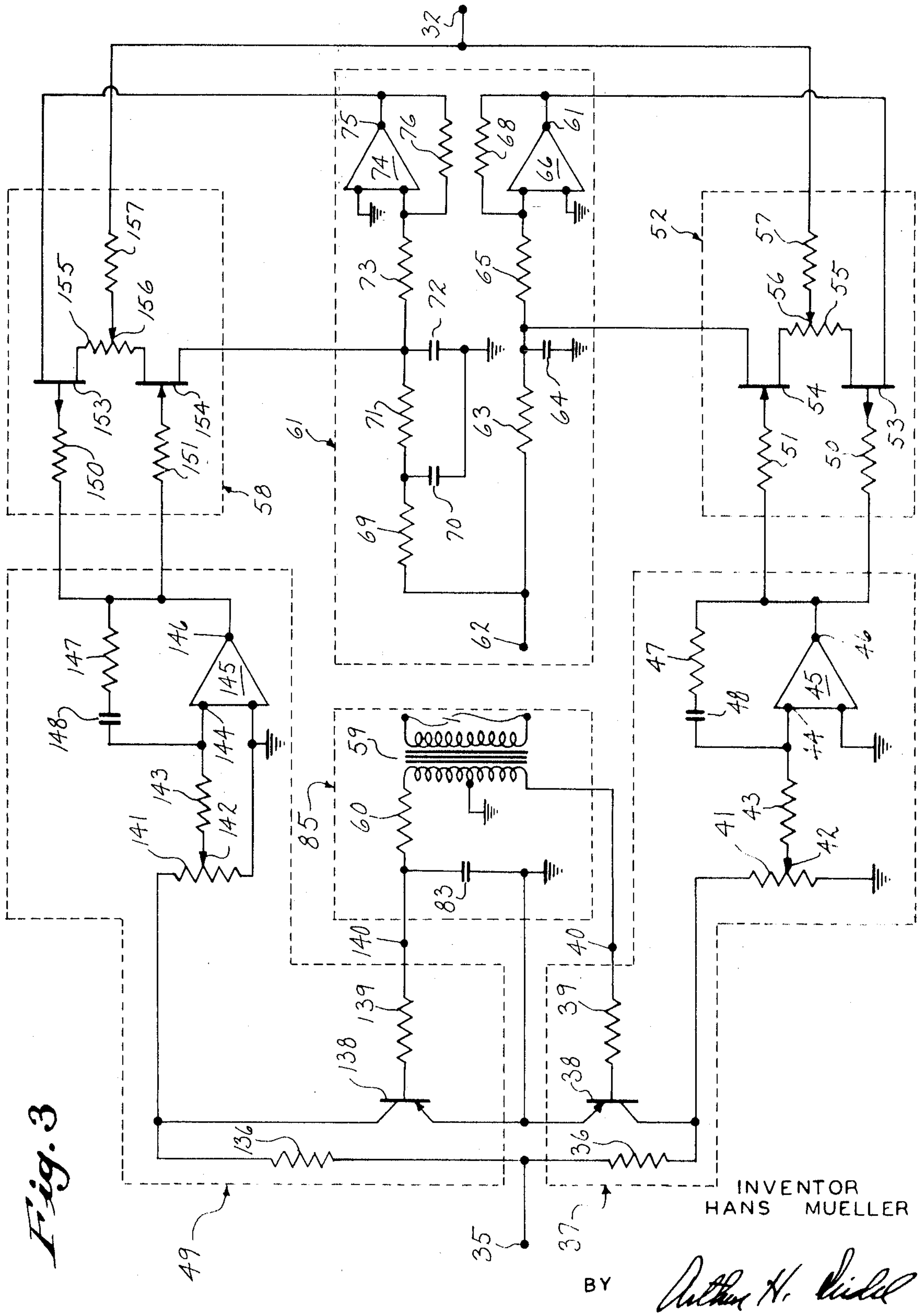
FIG. 3 is a schematic wiring diagram of a corrective circuit which forms part of the circuit shown in FIG. 1.

The electrical diagram of the corrective circuit is shown in FIG. 3. The input terminal 35 of this corrective circuit is connected to a coupling resistor 36 in a "reference" phase detector circuit 37. The term "reference" designates that the circuit 37 detects components of the signal applied at the input terminal 35 that are in phase with the power source frequency, or in other words, the component of the phasor appearing at terminal 35 that is in phase with the reference axis 30 of FIG. 5. In the reference phase detector 37 the coupling resistor 36 is connected to the collector of PNP switching transistor 38. The emitter of the switching transistor 38 is connected to ground and its base is connected through a coupling resistor 39 to a keying point 40. The collector of the switching transistor 38 is also connected to ground through a potentiometer 41. The slider 42 of the potentiometer 41 connects through an input resistor 43 to the inverting input 44 of an integrator amplifier 45. The noninverting input is connected to ground and the output terminal 46 of the integrator amplifier 45 is connected back to the inverting input 44 through a feedback resistor 47 and feedback capacitor 48.

The corrective circuit input terminal 35 is also connected to the coupling resistor 136 of an "orthogonal" phase detector circuit 49. The term "orthogonal" designates that the circuit 49 detects the component of the phasor appearing at terminal 35 that is in phase with the orthogonal axis of FIG. 5. The orthogonal phase detector 49 is identical in structure to the above-described reference phase detector 37, having a switching transistor 138 with its associated components and an integrator amplifier 145 with its associated components. Such components shown in FIG. 3 have been designated by numerals the same as for those in the circuit 37, except that they have the prefix 100.

Appearing at the output of the reference phase detector 37 is a "reference" error signal produced at the output terminal 46 of the integrator amplifier 45. This reference error signal is connected to one end of each of two coupling resistors 50 and 51 in a reference modulator circuit 52. The opposite end of the coupling resistor 50 is connected to the gate of a P-channel field effect transistor 52, and the opposite end of the coupling resistor 51 is connected to the gate of an N-channel field effect transistor 54. The source terminals on the field effect transistors 53 and 54 are joined together through a balancing potentiometer 55. The slider 56 on the balancing potentiometer 55 is connected to the corrective circuit output terminal 32 through a coupling resistor 57.

The output of the orthogonal phase detector 49 is an "orthogonal" error signal that is connected to coupling resistors 150 and 151 in an orthogonal modulator 58. The orthogonal modulator 58 is similar to the reference modulator 52 and has corresponding field effect transistors 153 and 154 connected to a balance potentiometer 155. The output of the orthogonal modulator 58 is connected from a potentiometer slider 156 to the corrective circuit output terminal 32 through a coupling resistor 157.

The corrective circuit thus far described consists of two identical circuits, one designated by the prefix 37 reference" and the other designated by the prefix "orthogonal." Their operation is similar, except for the phase relationship of synchronizing signals that are injected into their keying points 40 and 140, and for the signals applied to the drains of the field effect transistors 53, 54, 153 and 154.

The keying point 40 of the reference phase detector 37 is connected to one end of the secondary of a stepdown transformer 59. The other end of the transformer 59 secondary is connected through a phase shift network, comprised of a series resistor 60 and a shunt capacitor 83, to the keying point 140. The center tap of the transformer secondary is connected to ground, and the primary is connected across the input terminals 1 by leads 84 shown in FIG. 1. The transformer 59 and phaseshift network comprise a keying generator 85. The keying point 40 receives a 180° out of phase power source signal, designated herein as a negative reference signal, from the keying generator 85. Keying point 140 receives a negative orthogonal, or minus 90° out of phase power source signal from the keying generator 85 resulting from the phase shift network.

A quadrature generator 61 has its source terminal 62 connected to a power line 3 near the output terminal 2 as shown in FIG. 1. The source terminal 62 is connected through a series resistor 63 to one end of a shunt capacitor 64, which end is connected to the drain terminal of the field effect transistor 54 and to one end of a coupling resistor 65. The other end of the shunt capacitor 64 is connected to ground, and the combination of series resistor 63 and shunt capacitor 64 serves to introduce a small compensating phase lag to the power source signal applied to the drain of field effect transistor 54 and to the coupling resistor 65. The end of the coupling resistor 65 opposite the connection with the capacitor 64 is connected to the inverting input of a phase inverter amplifier 66. The noninverting input is connected to ground, and the output terminal 67 is connected through a feedback resistor 68 to the inverting input terminal. The output terminal 67 is also connected to the drain terminal of field effect transistor 53.

The source terminal 62 also connects through another series resistor 69 to one end of a shunt capacitor 70, and in turn through a second series resistor 71 to one end of a second shunt capacitor 72. This end of the second shunt capacitor 72 is connected to the drain of field effect transistor 154 and through a coupling resistor 73 to the inverting input of a phase inverter amplifier 74. The noninverting input on the phase inverter amplifier 74 is connected to ground and its output terminal 75 is connected to the inverting input through a feedback resistor 76. The output terminal 75 also is connected to the drain of the field effect transistor 153. One end of each of the first and second shunt capacitors 70 and 72 is connected to ground, and the resulting circuit composed of these capacitors and the first and second series resistors 69 and 71 serves to introduce a compensating phase lag equal to that produced by the series resistor 63 and shunt capacitor 64 described above plus an additional 90°. This compensating phase lag is introduced because the feedback signal from the output of the corrective circuit is injected into the common point 20 in the notch filter 12. The compensating phase lag is equal to the phase shift at power source frequency occurring between the common point 20 and output terminal 11 of the notch filter 12.

The quadrature generator 61 serves to produce four feedback signals, one for each of the field effect transistors 53, 54, 153 and 154 in the modulators 52 and 58. The quadrature generator 61 transmits to the drain of the field effect transistor 54 a constant positive reference feedback signal represented by the phasor 77 in FIG. 5. It generates a negative reference feedback signal to the drain of field effect transistor 53 which is represented by the phasor 78. It also generates a plus 90° out of phase, or positive orthogonal feedback signal, represented by the phasor 79 to the drain of field effect transistor 153, and a minus 90° out of phase, or negative orthogonal feedback signal, represented by the phasor 80 to the drain of field transistor 154.

OPERATION

For the purpose of explaining the operation of the corrective circuit, it is assumed that the notch filter 12 has become detuned to produce a power source signal at its output terminal 11 represented by the phasor 29 in FIG. 5 when there is no corrective feedback signal. Consequently for proper cancellation, a feedback signal must be produced at the correction circuit output terminal 32 having the power source frequency and an amplitude and phase angle represented by the phasor 29'. The compensating phase lag discussed above is a relatively small and constant amount which can be ignored for the purpose of explaining the remainder of the operation of the corrective circuit.

Referring to FIG. 5, it is shown that the power source signal represented by the phasor 29 is composed of, or can be divided into, a positive reference component 81 and a positive orthogonal component 82. The purpose of the reference phase detector circuit 37 is to detect the magnitude of this positive reference component 81 and generate an error signal indicative of its magnitude and polarity.

In the reference phase detector 37 the switching transistor 38 is alternately tuned on (saturated) and off by a reference keying signal injected into the keying point 40. The keying signal is negative, i.e. 180° out of phase, with respect to the power source phasor of FIG. 5 and causes the transistor 38 to conduct during alternate half cycles so as to act as a short circuit to signals conducted through the resistor 36 from the terminal 35. During the half cycles when the transistor 38 is off, the signal from the terminal 35 passes through potentiometer 41 to the integrator amplifier 45, and contains information that is indicative of the reference component 81. This signal is then integrated and inverted to produce a positive DC reference error signal at the output terminal 46 which is proportional to the magnitude of the reference component 81, and which is also indicative of the polarity of component 81.

Similarly, the purpose of the orthogonal phase detector circuit 49 is to generate a DC orthogonal error signal indicative of the magnitude and polarity of the positive orthogonal component 82. The keying point 140 in the orthogonal phase detector 49 is driven by a negative orthogonal signal (i.e. in phase with the downward direction of orthogonal axis 31 of FIG. 5) to alternately turn switching transistor 138 on and off for alternate half cycles 90° offset from the power source phasor of FIG. 5. The signal that is delivered to the potentiometer 141 during alternate half cycles is integrated and inverted 180° to produce a positive DC error signal at the output terminal 146 of the integrator amplifier 145.

Turning now to the reference modulator circuit 52, the quadrature generator 61, as described above, generates a positive reference feedback signal (phasor 77) to the drain of field effect transistor 54 and a negative reference feedback signal (phasor 78) to the drain of field effect transistor 53. When no voltage is applied to their gates, the transistors 53 and 54 are equally conductive with the result that the equal but opposite signals applied to their drains are summed to produce no output signal on the slider 56 of balance potentiometer 55. However, the positive error signal appearing at the output 46 of the reference phase detector 37 turns the P-channel field effect transistor 53 off relative to transistor 54, thus reducing the amount of positive reference feedback signal it will pass and leaving a resultant negative reference signal on the slider 56 of potentiometer 55 which has a magnitude, frequency and phase equal to that of component 81' in FIG. 5. This negative reference feedback signal appears at the output terminal 32.

Similarly, the orthogonal modulator circuit 58 receives positive and negative orthogonal feedback signals (phasers 79 and 80) from the quadrature generator 61 which cancel each other at the slider 156 of the balance potentiometer 155 when there is no error signal on the output 146 of the orthogonal phase detector 49. However, the positive error signal that does exist in the example under discussion tends to turn off the P-channel field effect transistor 153, with the result that a net negative orthogonal feedback signal represented by the component 82' appears at the output terminal 32 of the correction circuit. The sum of the reference and orthogonal feedback signals thus produced at the output 32 equals the desired feedback signal, phasor 29'.

The corrective circuits operate in a similar manner regardless of the phase angle of the power source frequency appearing at the output terminal 11 of the notch filter 12. For example, as shown in FIG. 5, a power source signal represented by the phasor 28 is cancelled, or nulled, by a feedback signal represented by the phasor 28'. The reference phase detector 37 again produces a positive error signal at its output, however, the amplitude of this signal is slightly less, causing the reference modulator to produce a slightly smaller, but still negative phase, reference feedback signal at the output terminal 32. On the other hand, the error signal produced at the output of the orthogonal phase detector 49 is reversed in polarity. This negative error signal tends to run off the N-channel field effect transistor 154 to leave a net positive orthogonal feedback signal, which is fed to the output terminal 32 to add with the negative reference feedback signal to produce the phasor 28'.

It should be readily apparent that a feedback signal of any phase angle or magnitude can be produced by the corrective circuit shown. The potentiometers 41 and 141 are adjusted to ensure that the feedback signal appearing at the corrective circuit output terminal 32 is of the proper magnitude to cancel out the power source signal appearing on the output terminal 11 of the notch filter 12. The balance potentiometer 55 is adjusted so that when there is no error signal at the output of the reference phase detector 37 there is no feedback signal produced by the reference modulator 52. The balance potentiometer 155 is similarly adjusted so that no feedback signal is produced by the orthogonal modulator 58 when there is no error signal produced by the orthogonal phase detector 49.

As shown and described above, the feedback signal from the corrective circuit is effectively injected into the common point 20 of the twin-T notch filter 12. An alternative method of injecting the feedback signal is to AC couple it through a capacitor connected to the output of the notch filter 12. This alternative method, however, is less desirable because of the unknown phase shift which the coupling capacitor introduces to the feedback signal.

Also, it may be desirable to add impedance matching circuits at various points in the circuit. For example, an impedance matching network may be connected at the output of the phase shift network comprised of the series resistor 60 and the shunt capacitor 83. As is well known to those skilled in the art, the advantage of such an impedance matching circuit is dependent on the input impedance of the portion of the circuit being fed, and is therefore an optional feature depending on the particular parameters chosen. Such impedance matching being optional, it is not shown here because such additional circuit components only obscure the description of the invention.

I claim:

1. A corrective circuit for an active band-pass filter, the combination comprising:

a signal generator connected to the power line to which the active band-pass filter is applied, and adapted to produce a plus and a minus reference signal output, and a plus and a minus orthogonal signal output;

a reference phase detector connected to receive a signal to be cancelled from the active band-pass filter, and connected to receive a reference signal from said signal generator to produce a reference error signal at the detector output terminal that indicates the magnitude and polarity of the reference component of the signal to be cancelled;

an orthogonal phase detector connected to receive the signal to be cancelled and connected to receive an orthogonal signal from the signal generator to produce an orthogonal error signal at the orthogonal phase detector output terminal that indicates the magnitude and polarity of the orthogonal component of the signal to be cancelled;

a reference modulator connected to receive said reference error signal and said plus and minus reference signals from the signal generator, and produce a reference feedback signal for said active band-pass filter; and an orthogonal modulator connected to receive said orthogonal error signal and said plus and minus orthogonal signals from the signal generator, and produce an orthogonal feedback signal for the active band-pass filter which is combined with the reference feedback signal and connected to cancel the signal received from the active band-pass filter.

2. The corrective circuit of claim 1 wherein said phase detectors each have a switching transistor and an integrator circuit.

3. The corrective circuit of claim 2 wherein the signal to be cancelled is connected to the collectors of said switching transistors and the signal generator outputs connected to the phase detectors are connected to the bases of said switching transistors.

4. The corrective circuit of claim 1 wherein said reference modulator has two transistors each controlled by said reference error signal, with one transistor connected to receive and amplitude modulate the plus reference signal and the other transistor connected to receive and amplitude modulate the minus reference signal from said signal generator.

5. The corrective circuit of claim 4 wherein said orthogonal modulator has two transistors each controlled by said orthogonal error signal, with one transistor connected to receive and amplitude modulate the plus orthogonal signal and the other transistor connected to receive and amplitude modulate the minus orthogonal signal from said signal generator.

6. An active band-pass filter having an input and output terminal connected together by a power line containing a correction transformer driven by an amplifier, and having a stop-band notch filter with an input connected to the power line, a common point, and an output connected to both the amplifier input and a band-pass filter, wherein the improvement comprises:

a signal generator connected to said power line and adapted to produce a plus and a minus reference signal output, and a plus and a minus orthogonal signal output;

a reference phase detector connected to both said band-pass filter and a reference signal output of said signal generator, and adapted to produce a reference error signal at its output;

an orthogonal phase detector connected to both said band-pass filter and an orthogonal signal output of said signal generator, and adapted to produce an orthogonal error signal at its output;

a reference modulator connected to said reference phase detector output and the plus and minus reference signal outputs of said signal generator, and adapted to produce a reference feedback signal at its output; and an orthogonal modulator connected to said orthogonal phase detector output and the plus and minus orthogonal signal outputs of said signal generator, and adapted to produce an orthogonal feedback signal at its output which is combined with said reference feedback signal and fed to the common point of said stop-band notch filter to cancel out power source frequencies tending to appear at the output of said stop-band notch filter.

7. The active band-pass filter as recited in claim 6, wherein said combined reference and orthogonal feedback signals are fed through a phase inverter to the common point on said stop-band notch filter.

8. The active band-pass filter as recited in claim 6, wherein the reference and orthogonal phase detectors each include:

a switching transistor with its collector connected to the band-pass filter and its base connected to receive the signal from the signal generator; and an integrator circuit having an input connected to the collector of the switching transistor and an output producing the error signal.

9. The active band-pass filter as recited in claim 6, wherein the reference and orthogonal modulators each include:

a first transistor having a control element and a controlled element, said first transistor connected to receive the error signal at its control element and amplitude modulate one of the signals from the signal generator connected to its controlled element;

a second transistor having a control element and a controlled element, said second transistor connected to receive the error signal at its control element and amplitude modulate the other signal received from the signal generator at its controlled element, such that the two amplitude modulated signals are summed to produce the feedback signal.

10. The active band-pass filter as recited in claim 6, wherein the signal generator comprises:

a keying generator adapted to generate a reference signal to said reference phase detector and an orthogonal signal to said orthogonal phase detector; and a quadrature generator adapted to generate the plus and minus orthogonal signals, and plus and minus reference signals to the modulators with an additional compensation lag.

* * * * *

PO-1050
(5/69)

UNITED STATES PATENT OFFICE
CERTIFICATE OF CORRECTION

Patent No. 3,628,057 Dated December 14, 1971

Inventor(s) Hans Mueller

It is certified that error appears in the above-identified patent and that said Letters Patent are hereby corrected as shown below:

| | |
|---|---|
| Column 1, line 12, | "3,53,652" should read – 3,531,652 – |
| Column 1, line 44, | "signals" should read – signal – |
| Column 3, line 1, | after "twin" – T – should appear |
| Column 3, line 36, | after "of" – $\theta$ – should appear |
| Column 3, line 41, | after "of" – $\phi$ – should appear |
| Column 4, line 19, | after "of" – a – should appear |
| Column 4, line 35, | after "axis" – 31 – should appear |
| Column 4, line 49, | "52" should read – 53 – |
| Column 4, line 67, | after "prefix" delete – 37 – and – reference" – should read – "reference" – |
| Column 6, line 16, | "tuned" should read – turned – |
| Column 7, line 11, | "run" should read – turn – |

Signed and sealed this 30th day of May 1972.

(SEAL)
Attest:

EDWARD M.FLETCHER,JR.
Attesting Officer

ROBERT GOTTSCHALK
Commissioner of Patents